(12) United States Patent
Davis

(10) Patent No.: US 6,178,150 B1
(45) Date of Patent: Jan. 23, 2001

(54) OFFSET OPTICS FOR USE WITH OPTICAL HEADS

(75) Inventor: Joseph E. Davis, Morgan Hill, CA (US)

(73) Assignee: Seagate Technology Inc., Scotts Valley, CA (US)

( * ) Notice: Under 35 U.S.C. 154(b), the term of this patent shall be extended for 0 days.

(21) Appl. No.: 08/798,912

(22) Filed: Feb. 12, 1997

Related U.S. Application Data (60) Provisional application No. 60/022,775, filed on Jul. 30, 1996, provisional application No. 60/023,476, filed on Aug. 6, 1996, and provisional application No. 60/025,801, filed on Aug. 27, 1996.

(51) Int. Cl.[7] .................................................. G11B 7/00
(52) U.S. Cl. .............................. 369/112; 369/14; 369/13; 369/44.19
(58) Field of Search ........................ 369/13, 112, 44.14, 369/44.15, 44.22, 44.19, 114, 113, 14

(56) References Cited

U.S. PATENT DOCUMENTS

| | | | |
|---|---|---|---|
| 4,003,059 | 1/1977 | Sugiura et al. | 346/108 |
| 4,135,083 | 1/1979 | Van Alem et al. | 250/201 |
| 4,581,529 | 4/1986 | Gordon | 250/227 |
| 4,626,679 | 12/1986 | Kuwayama et al. | 250/227 |
| 4,633,450 | 12/1986 | Gueugnon | 369/13 |
| 4,740,951 | 4/1988 | Lizet et al. | 370/3 |
| 4,796,226 | 1/1989 | Valette | 365/122 |
| 4,893,207 | 1/1990 | Maury et al. | 360/114 |
| 4,945,400 | 7/1990 | Blonder et al. | 357/74 |
| 5,033,043 | 7/1991 | Hayakawa | 369/121 |
| 5,105,408 | 4/1992 | Lee et al. | 369/44.15 |
| 5,119,361 | 6/1992 | Tanabe | 369/122 |
| 5,124,961 | 6/1992 | Yamaguchi et al. | 369/13 |
| 5,152,597 | 10/1992 | Barnard | 359/130 |
| 5,197,050 | 3/1993 | Murakami et al. | 369/13 |
| 5,199,090 | 3/1993 | Bell | 385/33 |
| 5,237,548 | 8/1993 | Muchnik | 369/13 |
| 5,245,491 | 9/1993 | Horie et al. | 360/114 |
| 5,296,988 | 3/1994 | Fujino | 360/110 |
| 5,325,116 | 6/1994 | Sampsell | 346/108 |
| 5,325,244 | 6/1994 | Takano et al. | 360/77.03 |
| 5,351,229 | 9/1994 | Brezoczky et al. | 369/113 |
| 5,536,926 | 7/1996 | Ikeda et al. | 235/462 |
| 5,541,908 | 7/1996 | Hsu et al. | 369/44.19 |
| 5,625,483 | 4/1997 | Swartz | 359/224 |
| 5,737,302 | 4/1998 | Kasahara | 369/118 |
| 5,742,419 | 4/1998 | Dickensheets et al. | 359/201 |

FOREIGN PATENT DOCUMENTS

| | | |
|---|---|---|
| 0331331A2 | 9/1989 | (EP) . |
| 0 460 889 A2 | 12/1991 | (EP) . |
| 0 460 890 A2 | 12/1991 | (EP) . |
| 0460890A2 | 12/1991 | (EP) . |
| 0 501 477 A2 | 9/1992 | (EP) . |
| 0501477A2 | 9/1992 | (EP) . |
| 0614101A2 | 9/1994 | (EP) . |
| 0650133A2 | 4/1995 | (EP) . |
| 0712121A2 | 5/1996 | (EP) . |
| 0712121A3 | 12/1996 | (EP) . |
| 2016744 | 9/1979 | (GB) . |
| 59-117180 | 6/1984 | (JP) . |
| WO 95/13638 | 5/1995 | (WO) . |

OTHER PUBLICATIONS

R. Boysel, T. McDonald, G. Magel, G. Smith, J. Leonard, "Integration of Deformable Mirror Devices with Optical Fibers and Waveguides", *SPIE*, vol. 1793, Integrated Optics and Microstructures (1992), pp. 34–39.

M. Daneman, O. Solgaard, N. Tien, K. Lau, R. Muller, "Laser–to–Fiber Coupling Module Using a Micromachined Alignment Mirror", *IEEE* Photonics Technology Letters, vol. 8, No. 3, Mar. 1996, pp. 396–398.

Patent Abstracts of Japanese Publication No. 62177738.
Patent Abstract of EPO Patent Application Publication No. EP 0 501 477 A3.

*Primary Examiner*—John W. Cabeca
*Assistant Examiner*—Kim-Kwok Chu
(74) *Attorney, Agent, or Firm*—Mark Wardas (57) ABSTRACT

An optical head is provided for transmission of light between a source of light and a storage location along an optical path that includes at least one offset optical element.

4 Claims, 8 Drawing Sheets

OFFSET OPTICS FOR USE WITH OPTICAL HEADS

CROSS REFERENCE TO RELATED APPLICATIONS

This application claims benefit of: Provisional Application Ser. No. 60/022,775, entitled "A Data Storage And Retrieval System Based On A Flying Magneto-Optical Head," filed on Jul. 30, 1996; Provisional Application Ser. No. 60/023,476, entitled "A Data Storage And Retrieval System Based On A Flying Magneto-Optical Head," filed on Aug. 6, 1996; and Provisional Application Ser. No. 60/025,801, entitled "A Data Storage And Retrieval System Based On A Flying Magneto-Optical Head," filed on Aug. 27, 1996. The subject matter of each of these related applications is incorporated herein by reference.

This application is related to copending U.S. patent application "Flying Optical Head With Dynamic Mirror," Ser. No. 08/731,214, filed Oct. 10, 1996, and copending U.S. patent application Ser. No. 08/745,095, "Optical System And Method Using Optical Fibers For Storage And Retrieval Of Information," filed Nov. 7, 1996, and U.S. patent application Ser. No. 08/771,057, now U.S. Pat. No. 5,850,375 issued on Dec. 15, 1998, entitled System And Method Using Optical Fibers In A Data Storage System, filed Dec. 20, 1996. All applications are commonly assigned.

BACKGROUND OF THE INVENTION

1. Field of the Invention

The present invention relates generally to optics used with optical heads and more particularly to offset optics used with magneto-optical heads.

2. Background Art

Winchester magnetic hard disk technology is influenced by a number of constraints, including, constraints imposed by flying magnetic head design. A typical prior art magnetic flying head includes a slider element and a magnetic read/write element and is coupled to a rotary actuator magnet and coil assembly by a suspension and actuator arm so as to be positioned over a surface of a spinning magnetic disk. In operation, lift forces are generated by aerodynamic interactions between the flying head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with magneto-optical (MO) storage technology. One motivation for using magneto-optical technology stems from the availability of high areal density magneto-optical storage disks (e.g., 3.5 gigabytes per square inch for magneto-optical storage). However, despite the historically higher areal storage density available for use with magneto-optical disks drives, the prior art MO disk drive volumetric storage capacity has generally not kept pace with the volumetric storage capacity of magnetic disk drives. One limiting factor has been the physical size of the head necessary to hold the optical elements required for accessing magneto-optical information. Magneto-optical information access requires the use of polarized laser light for reading and writing information on an MO disk. In the case of reading information, MO technology makes use of a magneto-optical effect ("Kerr" effect) to detect a modulation of polarization rotation imposed on a linearly polarized incident laser beam by a recorded surface. The polarization rotation (representing the information stored at recorded marks on the recorded surface or in the edges of the recorded marks) is embodied in a reflection of the linearly polarized laser beam and is converted by optics and electronics for readout.

Various MO flying head designs incorporating MO technology are described in U.S. Pat. No. 5,295,122 by Murakami, including: use of free-space alignment of a laser beam with a dynamically moving target and a number of different configurations of the magnetic and optical elements required for detection of the magneto-optical Kerr effect. Accordingly, the physical size of the prior art MO flying heads limits the spacing between magneto-optical disks to a finite minimum value. Consequently, because the volume available in standard height disk drives is limited, magneto-optical disk drives for use with magneto-optical flying heads have generally not been available as high capacity commercial products. Also, the larger the size and the greater the number and mass of the optical elements used to access information in prior art MO data storage and retrieval systems, the slower the speed at which the information may be accessed, the lower the tracking bandwidth becomes, and the lower the track density that may be read or written.

What is needed, therefore, is an apparatus and method that improves upon the prior art head designs. Compared to the prior art, the head should improve access to the high areal storage density of storage media, reduce the head weight and size, improve disk access time, require fewer components, and increase the number of storage disks that may be operated within a given volume.

SUMMARY OF THE INVENTION

The present invention is directed towards use of optics and optical heads for the transmission of light along an optical path located between a source and an optical storage location. Compared to the prior art, the optical head design of the present invention enables: improved access to the storage densities available with high density storage disks, improved disk access time, reduced optical head weight and size, use of fewer optical components with the optical head, and an increased number of storage disks that may be operated within a given volume.

The present invention provides offset optics for use with a magneto-optical head. The magneto-optical head may include a magnetic coil positioned in the optical path. The offset optics may be coupled to the magneto-optical head along or within a periphery of the magneto-optical head. The magneto-optical head offset optics may include: a reflective substrate, an objective element, an optical fiber, and/or a quarter-wave plate positioned in the optical path. In the present invention, the magneto-optical head may be a flying magneto-optical head, and the reflective substrate may be a steerable mirror positioned in the optical path so as to direct the light through the offset optics to the magneto-optical storage location.

DETAILED DESCRIPTION OF THE PREFERRED EMBODIMENTS

Figure 1:
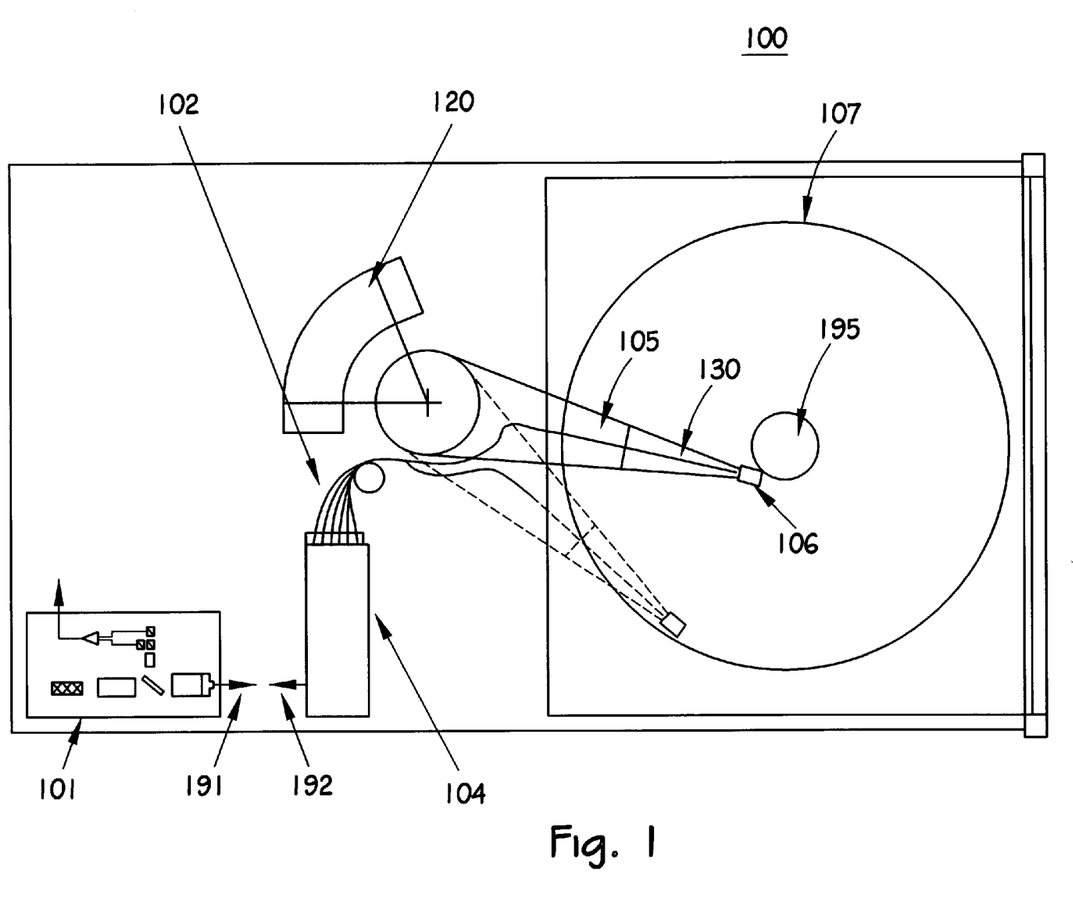
FIG. 1 is a diagram showing a magneto-optical data storage and retrieval system.

Referring in detail now to the drawings wherein similar parts of the invention are identified by like reference numerals, there is seen in FIG. 1 a diagram showing a magneto-optical data storage and retrieval system. In a preferred embodiment, magneto-optical (MO) data storage and retrieval system 100 includes a set of Winchester-type flying heads 106 that are adapted for use with a set of spinning MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of MO heads 106 and so as to maintain the set of MO heads 106 in a flying condition above the upper and lower surfaces of the set of MO disks 107. The lift forces are opposed by equal and opposite spring forces applied by the set of suspensions 130. During the flying condition, the set of MO heads 106 are maintained between a minimum and maximum flying height over a full radial stroke of the actuator arm 105 above and below the surfaces of the set of MO disks 107 such that the set of MO heads 106 do not directly contact the set of MO disks 107 during normal operation. During non-operation, the set of MO heads 106 are maintained statically in a storage condition away from the surfaces of the set of MO disks 107.

System 100 further includes: a laser-optics assembly 101, an optical switch 104, and a set of single-mode PM (polarization maintaining) optical fibers 102. In the preferred embodiment, each of the set of single-mode PM optical fibers 102 are respectively coupled through a respective one of the set of actuator arms 105 and the set of suspensions 130 to a respective one of the set of MO heads 106. As will be discussed shortly, the set of MO heads 106 are used in a configuration that, compared to the prior art, enables improved access to the high areal storage density capability of magneto-optical storage media, reduces the weight and size of the head, improves disk access time, requires fewer optical components, and increases the number of storage disks that may be operated within a given volume.

Figure 2:
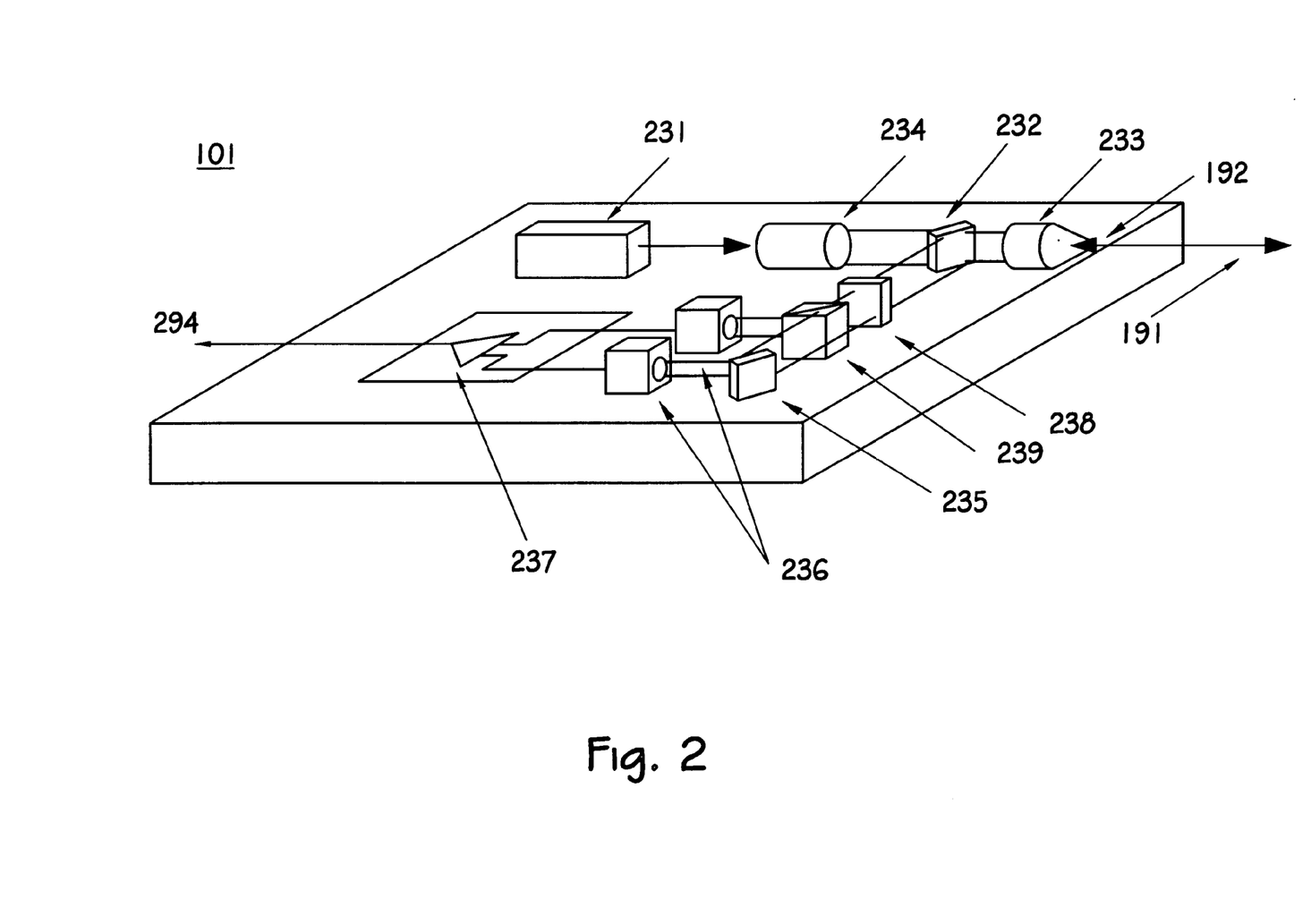
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized RF modulated laser source 231 operating in a visible or near ultraviolet frequency region and emitting an optical power sufficient for reading and writing using the set of MO disks 107. Laser-optics assembly 101 further includes: a collimating optics 234, a low wavelength dispersion leaky beam splitter 232, and a coupling lens 233. In the preferred embodiment, laser-optics assembly 101 directs (from the linearly polarized laser source 231) a linearly polarized outgoing laser beam 191 (shown in FIG. 1) to the optical switch 104. Laser-optics assembly 101 further includes: a ¼ wave plate 238, a mirror 235, and a polarizing beam splitter 232. In the preferred embodiment, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO disks 107. In the preferred embodiment, after conversion by a set of photodiodes 236, the differential signal is processed by the differential amplifier 237 and is output as signal 294. While the preferred embodiment includes one well known arrangement of optical components embodied as the laser-optics assembly 101, those skilled in the art will recognize that the present invention is not meant to be limited to this one arrangement, as other techniques for directing the outgoing laser beam 191 and for detecting the reflected laser beam 192 are well known in the art.

Figure 3:
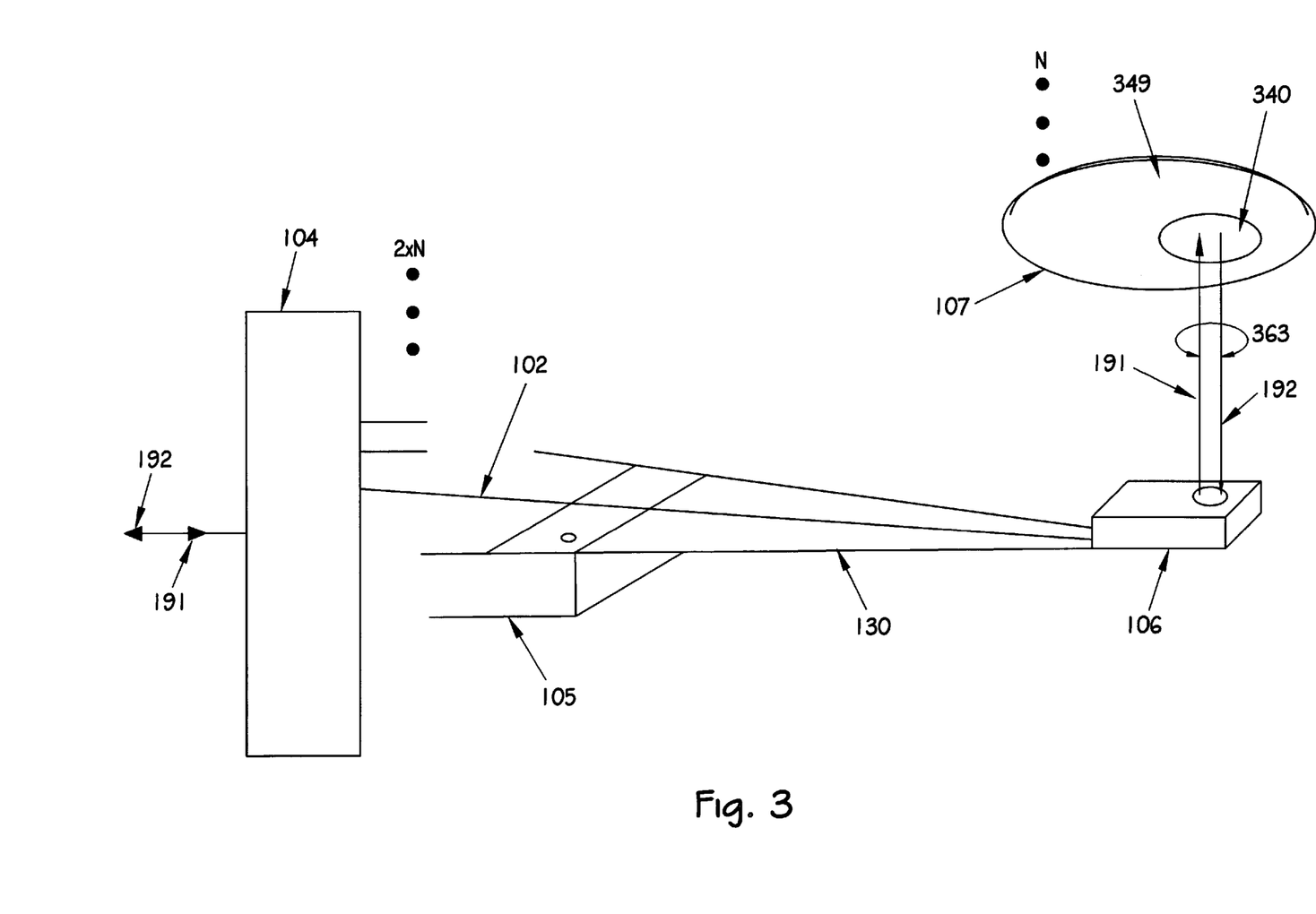
FIG. 3 is a diagram showing an optical path that includes one of the optical fibers and the optical switch of the magneto-optical data storage and retrieval system of FIG. 1.
Figure 4A:
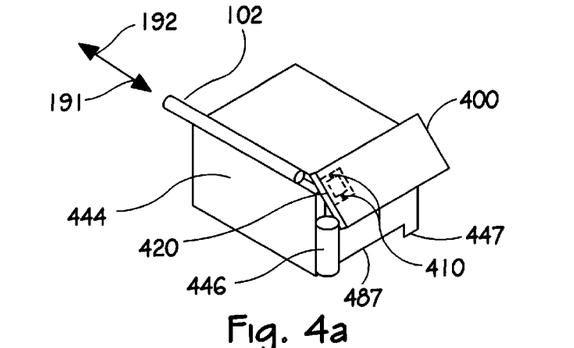
FIG. 4 is a diagram showing one embodiment of the flying magneto-optical head of the magneto-optical data storage and retrieval system of FIG. 1.
Figure 4B:
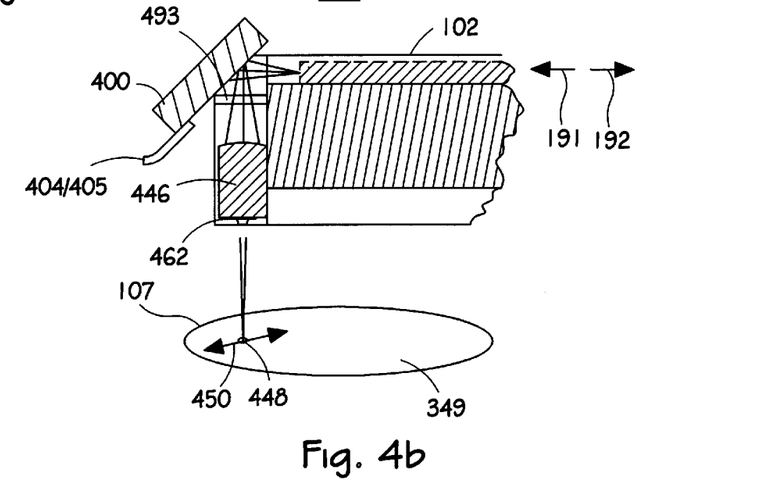
Figure 4C:
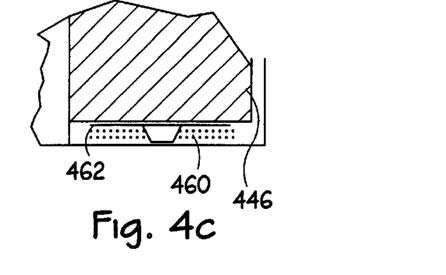
Figure 4D:
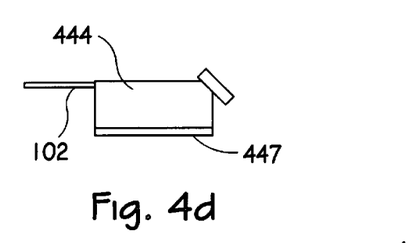
Figure 4E:
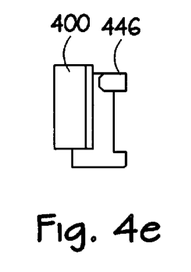
Figure 4F:
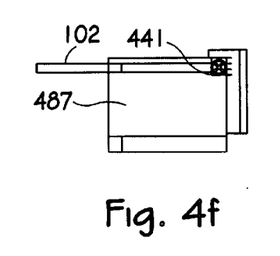
Figure 4G:
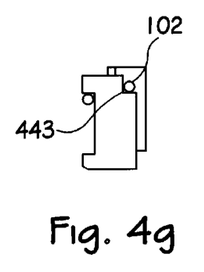

FIG. 3 is a diagram showing an optical path that includes one of the optical fibers and the optical switch of the magneto-optical data storage and retrieval system of FIG. 1. Those skilled in the art will recognize that the set of optical paths of the present invention may be described with reference to a single optical path, shown in FIG. 3 to include: the optical switch 104, one of the set of single-mode PM optical fibers 102, and one of the set of MO heads 106. In the preferred embodiment, optical switch 104 provides sufficient degrees of selectivity for directing the outgoing laser beam 191 (with reference to laser source 231) towards a respective proximal end of a respective single-mode PM optical fiber 102. The outgoing laser beam 191 is further directed by the single-mode PM optical fiber 102 to exit a respective distal end so as to pass through the MO head 106 onto a surface recording layer 349 of a respective MO disk 107.

During writing of information, the outgoing laser beam 191 is selectively routed by the optical switch 104 to the MO disk 107 so as to lower a coercivity of the surface recording layer 349 by heating a selected spot of interest 340 to at least the Curie point of the MO recording layer 349. In the preferred embodiment, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools at the surface layer 349, information is encoded at the surface of the respective spinning disk 107.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the surface layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the MO head 106 and enters the distal end of the single-mode PM optical fiber 102. The reflected laser beam 192 propagates along the single-mode PM optical fiber 102 to exit at its proximal end and is selectively routed by the optical switch 104 for transmission to laser-optics assembly 101 for subsequent conversion to signal 294.

Figure 5:
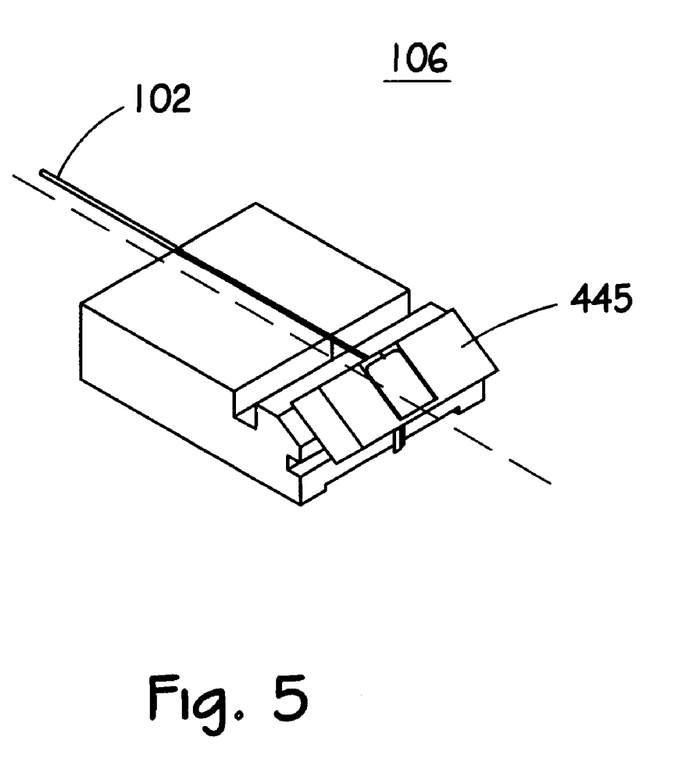
FIG. 5 is a diagram showing an alternative embodiment of the flying magneto-optical head of the magneto-optical data storage and retrieval system of FIG. 1.

FIGS. 4 and 5 are diagrams showing two embodiments of the flying magneto-optical head of the magneto-optical data storage and retrieval system of FIG. 1. Those skilled in the art will recognize that the set of flying MO heads of the present invention may be illustrated by reference to a single representative MO head 106, which is shown in the detailed views of FIG. 4 and 5 as a flying MO head 106 for use below a surface recording layer 349 of one of the set of MO disks 107. In the preferred embodiment, the flying MO head 106 includes: a slider body 444, an air bearing surface 447, a quarter-wave plate 493, a reflective substrate 445, objective optics 446, and a magnetic coil 460. In the preferred embodiment, the slider body 444 is dimensioned according to mechanical and optical constraints that include: physical size, numerical aperture (NA), and working distances between the objective optics 446, the single-mode PM optical fiber 102, and the reflective substrate 445. In the preferred embodiment, the reflective substrate 445 may comprise a reflective surface which is aligned at an angle of 45 degrees relative to the air bearing surface 447 and may include a steerable micro-machined mirror. While, slider body 444 may be dimensioned as an industry standard "mini", "micro", "nano", or "pico" slider, those skilled in the art will recognize that, as determined by the aforementioned mechanical and optical constraints, alternatively dimensioned slider bodies 444 may also be used. Accordingly, in the preferred embodiment, slider body 444 comprises a mini slider height (889 um) and a planar footprint area corresponding to that of a nano slider (1600×2032 um).

In the preferred embodiment, the single-mode PM optical fiber 102 is coupled to an axial cutout 443 along an edge of the slider body 444, and the objective optics 446 is coupled to a vertical cutout 411 along a corner of the slider body 444. While the axial cutout 443 is preferably located along a periphery of the slider body and the vertical cutout 411 is located at a corner of the slider body 444, those skilled in the art will recognize that the axial cutout 443 and the vertical cutout 411 may be located at other positions on the flying MO head 106, for example as shown in the detailed views of FIG. 5, between the periphery and a central axis and towards a first end more generally than a second end respectively. Those skilled in the art will recognize that positioning the optical fiber 102 and the objective optics 446, at other than along a central axis, may function to affect a center of mass of the magneto-optical head 106 and, thus, its flying dynamics. Accordingly, the point of attachment of the MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 102 and objective optics 446 to the flying MO head 106. In the preferred embodiment, the laser beams 191 and 192 traverse an optical path (to and from the surface recording layer 349 of the MO disk 107) that includes: the single-mode PM optical fiber 102, the reflective substrate 445, the quarter-wave plate 493, and the objective optics 446. In the preferred embodiment the single-mode PM optical fiber 102 and the objective optics 446 are positioned within their respective cutouts to achieve focus of the outgoing laser beam 191 within the spot of interest 340 as a focused optical spot 448. The single-mode PM optical fiber 102 and the objective optics 446 may be subsequently secured in place by using ultraviolet curing epoxy or similar adhesive. In the preferred embodiment, the objective optics 446 comprises a micro plano-convex GRIN (Graded Index) lens that has a diameter of 0.254 um and a numerical aperture (NA) of approximately 0.65. The objective optics 446 preferably focuses the optical spot 448 with a full width at half-maximum intensity (FWHM) of approximately 0.55 um±2% at the focused optical spot 448. The reflective substrate 445, quarter-wave plate 493, and objective optics 446 are preferably compact and low mass so as to fit within a physical volume approximating the rectangular volumetric dimensions of the slider body 444 and yet sufficiently large to direct a full cross section of the outgoing and reflected laser beams 191 and 192 so that minimal power is lost and significant distortion and aberrations in the outgoing and reflected laser beams 191 and 192 are not introduced.

While the objective lens comprising the GRIN lens 446 has been described as a single element objective lens, it will be appreciated by those skilled in the art that additional objective optics may also be used to enhance the properties of the GRIN lens 446. For example, the objective optics may include either an aplanatic lens or a solid immersion lens in conjunction with the GRIN lens 446. Use of such an additional lens element achieves a larger numerical aperture and hence a smaller focused optical spot size. A smaller spot size would preferably increase higher area data densities to be written to and read from the MO disk 107. Micro-optic lenses made by molding glass or plastic may also be used in place of the GRIN lens 446. For example, two molded plano-convex aspherical lens may be combined by placing the two convex surfaces toward one another to provide a miniature lens system with high numerical aperture and good off-axis performance. In a dual aspherical optical design, light would be approximately collimated between the two optical elements, thus, the quarter wave plate 493 could be placed between the two elements without requiring additional lenses. In another embodiment, a single molded spherical lens with low numerical aperture (0.2–0.4) may be used in conjunction with an aplanatic or solid immersion lens to yield an optical focusing system with relatively high numerical aperture (greater than 0.6). From a manufacturing perspective, molded lenses are attractive because they can be produced in high volume at low cost. One method disclosed here for mass production involves molding a lens array and subsequently sectioning of the array by diamond saw cutting or laser cutting to obtain individual lenses. Regarding the aforementioned two-lens design, two molded plano-convex lens arrays may be mated by means of tapered fittings before sectioning to ensure accurate lens alignment.

In an alternative embodiment, a linearly adjustable optical element (not shown) may be included in the optical path (between the single-mode PM optical fiber 102 and the reflective substrate 445) to optically alter the outgoing laser beam 191 as the beam exits the single-mode PM optical fiber 102, permitting the optical spot 448 to be focused to include multiple focal positions. Accordingly, in the previously mentioned alternative embodiment, an MO disk 107 that has multiple storage levels may be used. Those skilled in the art will recognize that the linearly adjustable optical element may be positioned by a linear micro-machined motor or a piezoelectric transducer (not shown).

Those skilled in the art will recognize that the single-mode PM optical fiber 102 functions as an aperture of a confocal optical system that has a large depth resolution along its optical axis and an improved transverse resolution. The improved transverse resolution improves the detection of smaller magnetic domain orientations as well as detection of magnetic domain edges as compared to a non-confocal system. The large depth resolution minimizes cross-talk between closely spaced surface recording levels when using multi-level storage media.

As disclosed in commonly assigned Provisional Applications Ser. Nos. 60/022,775, 60/023,476, and 60/025,801, the reflective substrate 445 may comprise a steerable micro-machined mirror. As used in the magneto-optical storage and retrieval system 100, fine tracking and short seeks to adjacent tracks are performed by rotating a reflective inner mirror plate portion 420 of the reflective substrate 445 about a rotation axis so that the propagation angle of the outgoing laser beam 191 is changed before transmission to the objective optics 446. The reflective inner mirror plate portion 420 is rotated by applying a differential voltage to drive electrodes. The differential voltage on the electrodes creates an electrostatic force that rotates the reflective inner mirror plate portion 420 about torsional hinges, enabling the focused optical spot 448 to be scanned with an angular deflection, which in an exemplary embodiment comprises approximately ±2 degrees or equivalently approximately ±4 tracks on the MO disk 107, back and forth in a direction 450 that is approximately parallel to the radial direction of the MO disk 107. Consequently, movement of the focused optical spot 448 across the MO disk 107 and detection of the reflected laser beam 192 may be used in storage and retrieval of information, track following, and seeks from one data track to another data track. Coarse tracking may be maintained by adjusting a current to rotary actuator magnet and coil assembly 120. The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. If embossed pits are used, those skilled in the art will recognize that an adder output circuit may be used to supplement the differential output circuit 237. Those skilled in the art will recognize that conventional prior art Winchester magnetic disk drives using more than one magnetic disk use a set of respective suspensions and actuator arms that move in tandem as one integral unit; therefore, during track following using a particular magnetic disk surface, simultaneous track following of other magnetic disk surfaces is not possible. Accordingly, in the prior art, writing or reading of information cannot occur to more than one disk surface at a time. In contrast, irrespective of the movement of the set of actuator arms 105 and set of suspensions 130, use of the steerable micro-machined mirrors with the set of flying MO heads 106 of the present invention permits independent track following and seeks and thus independent reading and/or writing of information to more than one disk surface at a time. In such a system (not shown), separate laser-optics assemblies 101, read channel and fine track electronics, and mirror driving electronics would preferably be required for each flying MO head 106.

Figure 6:
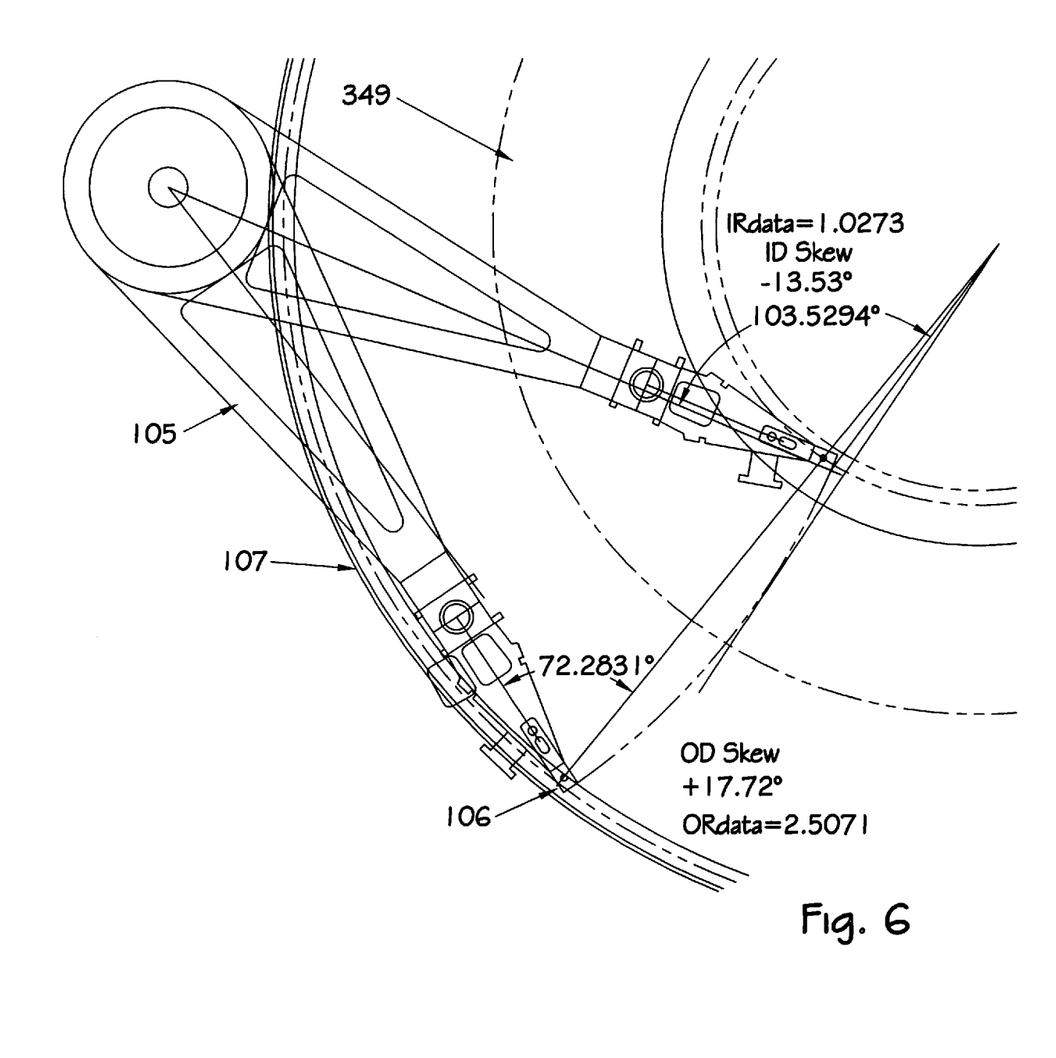
FIG. 6 is a diagram of a magneto-optical head used over a surface of a magneto-optical disk.

FIG. 6 is a diagram of a magneto-optical head used over a surface of a magneto-optical disk. In the preferred embodiment, the excursion of the optical spot formed by the objective optics 446 (FIG. 4) over the surface recording layer 349 of the MO disk 107 is limited at an outer radius by a requirement that the flying MO head 106 maintain a stable aerodynamic flying height and at an inner radius by mechanical constraints of the magneto-optical (MO) data storage and retrieval system 100 that limit movement of the actuator arm 105. Accordingly, in an exemplary embodiment, the objective optics 446 may access a maximum usable area of the surface recording layer 349 that comprises a minimum inner radius $r_i$ that is 26.093 mm and a maximum outer radius $r_o$ that is 63.680 mm. In the exemplary embodiment, the MO disk 107 comprises 1406.5 data tracks/mm (e.g., a track pitch of 0.711 um), and the flying MO head 106 is oriented over the MO disk 107 at the maximal inner excursion with a skew angle of −13.53 degrees and at the maximal outer excursion with a skew angle of 17.72 degrees (relative to tangential lines drawn at the radial data tracks located at the intersection point of the optical spot formed by the objective optics 446 and the minimum inner and maximum outer radii of the surface recording layer 349, respectively). In the exemplary embodiment, the areal density over all the MO disk 107 radii is maximized using "zone recording" techniques that are well known in the art, and a maximum user data rate at the outer radius of the MO disk 107 comprises at least 120 Mbits/sec (at a rotation rate of approximately 4500 RPM). Those skilled in the art will recognize that the user data rate $R_D$ may be calculated using the relationship $R_D=(v) \times (D_L)$ (where v=disk velocity and $D_L$=linear bit density of the MO disk 107). The disk velocity $v_0$ at the outer radius of the MO disk 107 may be calculated using the relationship $v_0=r_0\omega=$ (63.680 mm)×(2π rad/rev)×(4500 rev/60 sec)=30.008 m/s. Accordingly, the linear bit density $D_L$ required to sustain the desired maximum user data rate at the outer radius may be calculated using the relationship $D_L=R_D/V_0=$(120 Mbits/sec)/(30.008 m/s)=3998.9 bits/mm.

Figure 7:
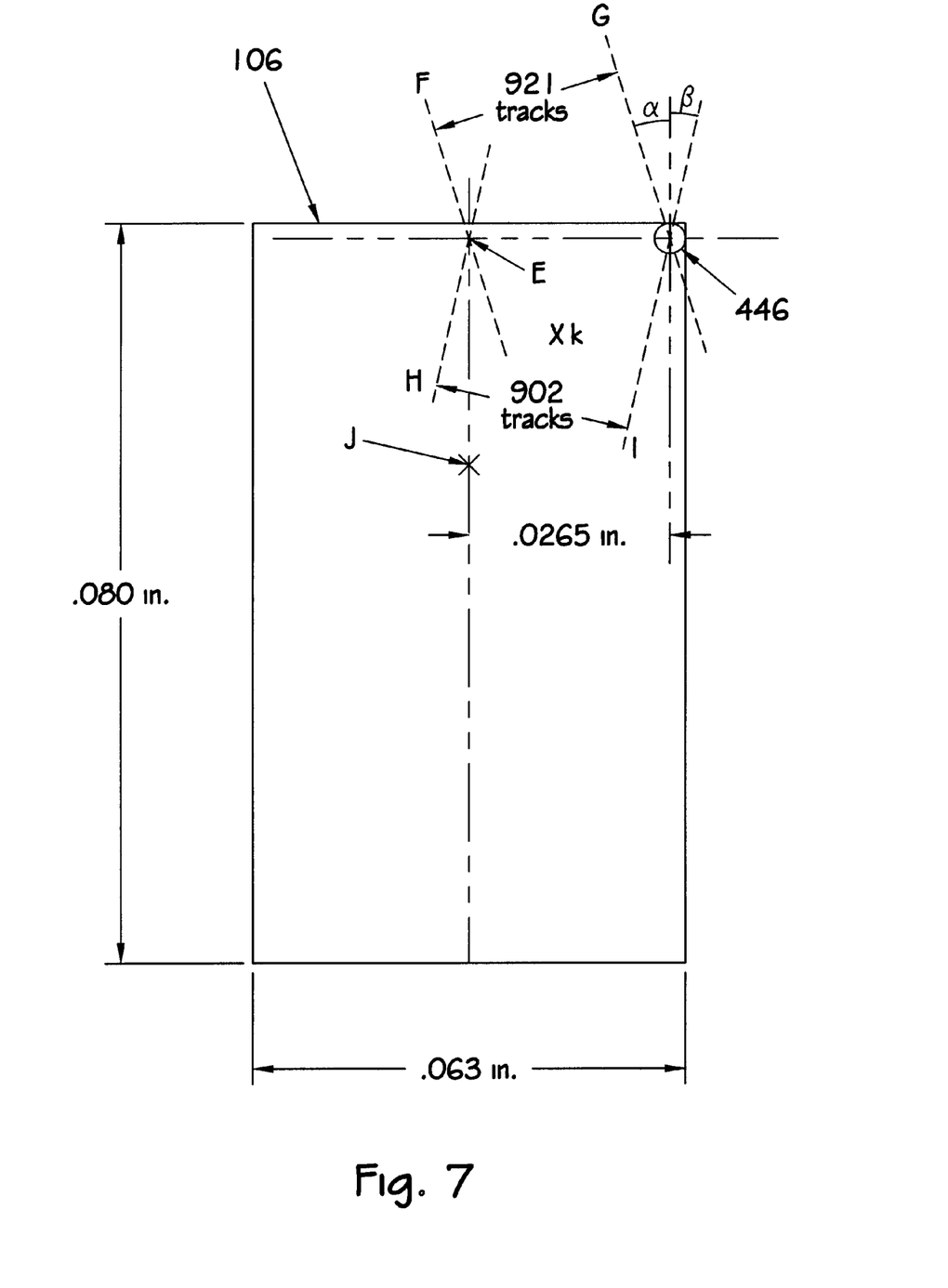
FIG. 7 is a diagram illustrating the data tracks that are gained and lost by positioning the objective optics and magnetic coil at a corner of the magneto-optical head.

FIG. 7 is a diagram illustrating the data tracks that are gained and lost by positioning the objective optics and magnetic coil at a corner of the magneto-optical head. Those skilled in the art will recognize that use of objective optics along a central axis and inward from a periphery of a flying MO head results in data tracks at the outer radius of a respective MO disk that may not be accessed. In the present invention, because the objective optics 446 and the magnetic coil 460 are located towards or at a periphery of the flying MO head 106 (as compared to locating the objective optics 446 inward from the periphery and along a central axis of the flying MO head 106), the radial data tracks that may be accessed at the outer excursion of the magneto-optical head 106 is offset by approximately an equal number of radial data tracks that are inaccessible at the inner excursion of the flying MO head 106. The present invention takes advantage of the increased recording capacity of the data tracks at the outer radii as compared to the recording capacity of the data tracks at the inner radii. By using the offset objective optics 446 and the magnetic coil 460 of the present invention, the present invention increases the amount of data that may be written and read using the MO disk 107.

The increase in data that may be accessed from the surface recording layer 349 of the MO disk 107 may be illustrated by comparing a position of the objective optics 446 and the magnetic coil 460 at a corner of the magneto-optical head 106 to an objective optics and a magnetic coil positioned along a central axis of the magneto-optical head 106. In FIG.

7, the comparison is illustrated by a perpendicular distance between a tangential line drawn at a radial data track located at the optical spot formed by the objective optics 446 and a tangential line drawn at a radial data track located under point E. In the exemplary embodiment, the objective optics 446 and the magnetic coil 460 are placed 0.0265 inches off-center from the central axis at a corner of the MO head 107. In the exemplary embodiment, at the maximal outer excursion of the MO head 106, the perpendicular distance between the tangential lines (F and G) may be calculated as $d_o$=(0.0265 in.)×(cos 17.72 degrees)=0.02525 in.=641.165 um. and at the maximum inner excursion between the tangential lines (H and I) as $d_i$=(0.0265 in.)×(cos 13.53 degrees)=0.025765 in=654.42 um. Accordingly, compared to point E, the placement of the objective optics 446 and magnetic coil 460 at a corner of the MO head 106 results in a gain of approximately 902 data tracks at the maximal outer excursion of the MO head 106 (e.g., 641.165 um /0.711 um/track), and a loss of approximately 921 tracks at the maximal inner excursion of the MO head 106 (e.g., 654.42 um /0.711 um/track). In the exemplary embodiment, the data gained with the maximal outer excursion of the MO head 106 may be calculated using the relationship $C_o$=(902 tracks)×($D_L$)×($2\pi$)×($r_o'$), where $r_o'$ is a mean radius of the recording tracks gained (calculated as $r_o$−(0.5)×(641.165 um)=63.3594 mm), and the data lost with the maximal inner excursion of the MO head 106 may be calculated from the relationship $C_i$=(921 tracks)×($D_L$)×($2\pi$)×($r_i'$), where $r_i'$ is a mean radius of the recording tracks lost (calculated as $r_i$−(0.5)×(654.42 um)=26.4202 mm). Accordingly, $C_o$=1.43595 Gb (Gigabits)=179.493 MB (Mega Bytes), and $C_i$=0.061139 Gb=76.423 MB. Compared to objective optics positioned at point E on the magneto-optical head 106, the exemplary embodiment provides a net gain of 103.070 MB that may be read and written from the MO disk 107. Thus, compared to prior art objective optics located along a central axis and inward from the periphery of an MO head (e.g., point F), placement of the objective optics 446 and the magnetic coil 460 at the periphery of the MO head 106 provides an increase in the amount of data that may be read and written by the magneto-optical (MO) data storage and retrieval system 100. Those skilled in the art will recognize that while in the preceding discussion the objective optic 446 has been described as being located along a periphery of the flying MO head 106, other positions of the objective optics 446 and magnetic coil 460 may also achieve an increase data access over the prior art, for example, at a location within the periphery and offset from the central axis (e.g., point K on the flying MO head 106).

Figure 8:
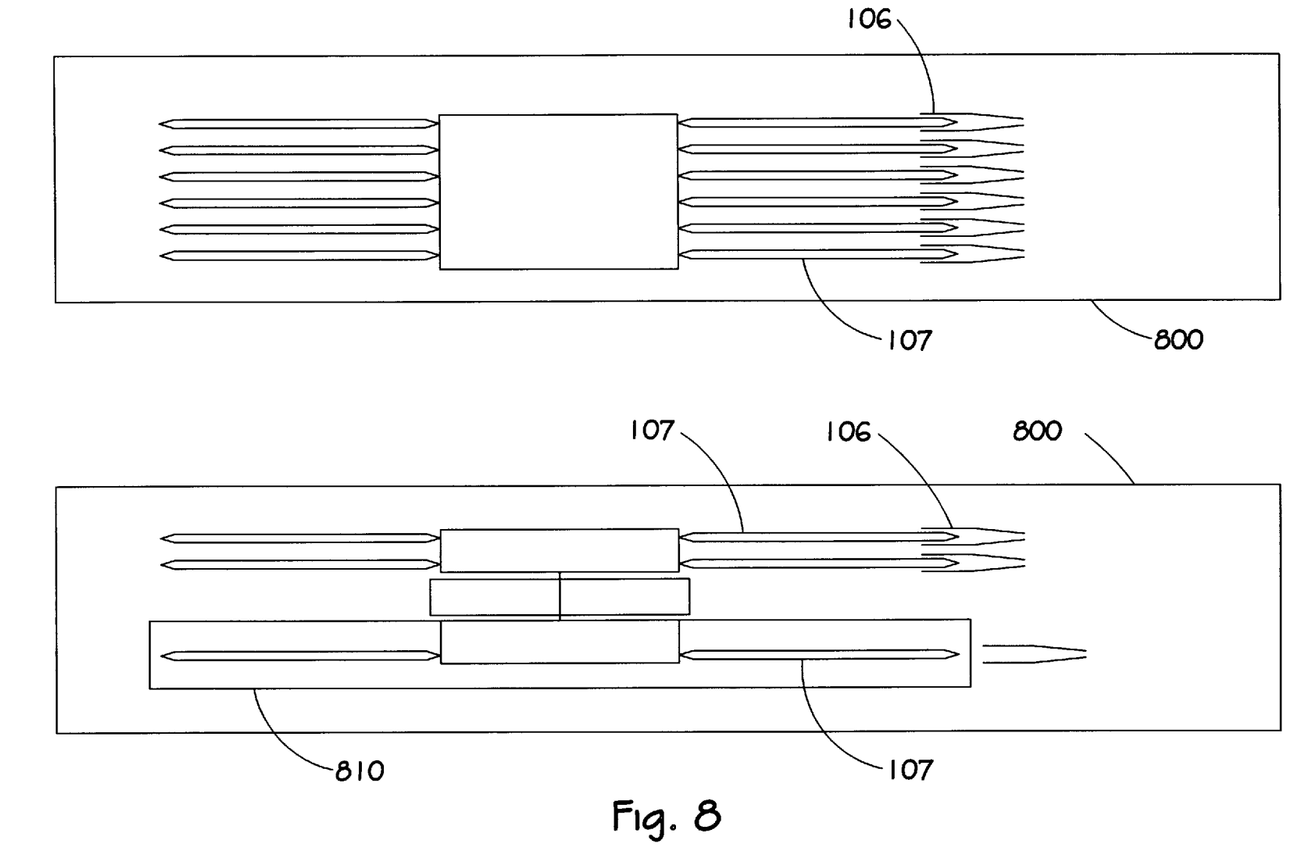
FIG. 8 is a diagram showing a magneto-optical data storage and retrieval system as part of a magneto-optical disk drive.

FIG. 8 is a diagram showing a magneto-optical data storage and retrieval system as part of a magneto-optical disk drive. In the preferred embodiment, the present invention may be used in a compact high-speed and high-capacity MO disk drive 800 that may comprise an industry standard 5.25 inch half-height form factor (1.625 inch) and that includes: six internal MO disks 107 and twelve flying MO heads 106. The MO disk drive 800 may further include: the optical switch 104 and twelve single-mode PM optical fibers 102. Those skilled in the art will recognize that by providing a set of low noise, low mass, and low profile optical paths comprising the offset objective optics 446 and the magnetic coil 460 located on each of the flying MO heads 106, the MO disk drive 800 may comprise a higher volumetric storage capacity than is permitted in an equivalent volume of the prior art.

In an alternative embodiment, the half-height form factor MO disk drive 800 may include a removable MO disk cartridge portion 810 and two fixed internal MO disks 107. By providing the removable MO disk cartridge portion 810, the fixed internal and removable combination permits external information to be efficiently delivered to the MO disk drive 800 for subsequent transfer to the internal MO disks 107. The copied information may, subsequently, be recorded back onto the removable MO disk cartridge portion 810 for distribution to other computer systems. In addition, the removable MO disk cartridge portion 810 allows for very convenient and high speed back-up storage of the internal MO spinning disks 107. The fixed internal and removable combination also permits storage of data files on the removable MO disk cartridge portion 810 and system files and software applications on the internal MO spinning disks 107. In another alternative embodiment (not shown) an MO disk drive 800 may include: any number (including zero) of internal MO disks 107 and/or any number of MO disks 107 within any number of removable MO disk cartridge portions 810. The present invention does not necessarily require use of rotary actuator arms, for example, linear actuator arms may be used. The low profile optical paths disclosed by the present invention may be used to convey information to and from a storage location without requiring objective optics (e.g., using a tapered optical fiber or an optical fiber with a lens formed on an end) and/or reflective substrates (e.g., using a curved optical fiber to convey information along right angle surfaces of the magneto-optical head), and/or quarter-wave plates, for example, as disclosed in commonly assigned Patent Application entitled, "System And Method Using Optical Fibers In A Data Storage System," filed Dec. 20, 1996. Free space optical paths may also be used to deliver and receive laser light, for example, with a suitably aligned laser diode and detector mounted on the actuator arm or, alternatively, on the flying head.

While the present invention is described as being used in an MO disk drive 800, use of offset objective optics and/or magnetic coils, as described with reference to FIGS. 1–8, may be practiced in many different environments and many different embodiments, for example, with other form factors, with other optical sources of light, with other types of optical fibers, and/or with other types of optical elements. The present invention is also applicable to information transfer using other head technologies, for example, optical heads in compact disks (CD) and digital video disks (DVD).

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. An optical head for transmission of light along an optical path located between a source and a storage location, comprising:

a slider body, wherein said body comprises a periphery, wherein said periphery comprises a corner, wherein said periphery comprises a first end and a second end, and wherein said first end is disposed opposite said second end; and at least one optical element coupled to said body and aligned in said optical path, wherein said at least one optical element is disposed on said body to be closer to said second end than said first end, wherein said at least one optical element is disposed at said corner, and wherein said at least one optical element comprises a steerable mirror.

2. An optical head for transmission of light along an optical path located between a source and a storage location, comprising:

a body, wherein said body comprises a periphery, wherein said periphery comprises a first end and a second end, wherein said first end is disposed opposite said second end, wherein said light passes from said source along said optical path in a direction from said first end to said second end, wherein said body further comprises a central axis, and wherein said central axis traverses a direction from said first end to said second end; and at least one optical element coupled to said body and aligned in said optical path, wherein said at least one optical element is disposed on said body to be closer to said second end than said first end, and wherein said at least one optical element is disposed to be offset from said central axis; and wherein said at least one optical element comprises an optical fiber and wherein said optical fiber directs said light between said source and an outermost radius of said storage location.

3. An optical head for transmission of light along an optical path located between a source and a storage location, comprising:

a slider body, wherein said body comprises a periphery, wherein said periphery comprises a first end and a second end, wherein said first end is disposed opposite said second end, wherein said light passes from said source along said optical path in a direction from said first end to said second end, wherein said body further comprises a central axis, and wherein said central axis traverses a direction from said first end to said second end; and at least one optical element coupled to said body and aligned in said optical path, wherein said at least one optical element is disposed on said body to be closer to said second end than said first end, wherein said at least one optical element is disposed to be offset from said central axis, and wherein said at least one optical element comprises a steerable mirror.

4. An optical head for use in an optical path located between a source and a magneto-optical storage location, comprising:

a slider body, wherein said body comprises a periphery, wherein said periphery comprises a first end and a second end, and wherein said first end is disposed opposite said second end, wherein a light passes from said source along said optical path in a direction from said first end to said second end;

a magnetic coil, wherein said magnetic coil is coupled to said body; and at least one optical element, wherein said at least one optical element is coupled to said body and aligned in said optical path, and wherein said at least one optical element is disposed closer to said second end than said first end, wherein said at least one optical element is disposed along said periphery, and wherein said at least one optical element comprises a steerable mirror.

* * * * *